United States Patent
Ozawa

(10) Patent No.: US 8,891,539 B2
(45) Date of Patent: Nov. 18, 2014

(54) RE-SEARCHING REFERENCE IMAGE FOR MOTION VECTOR AND CONVERTING RESOLUTION USING IMAGE GENERATED BY APPLYING MOTION VECTOR TO REFERENCE IMAGE

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 98 days.

(21) Appl. No.: 13/119,250

(22) PCT Filed: Sep. 25, 2009

(86) PCT No.: PCT/JP2009/066658
§ 371 (c)(1),
(2), (4) Date: Mar. 16, 2011

(87) PCT Pub. No.: WO2010/035787
PCT Pub. Date: Apr. 1, 2010

(65) Prior Publication Data
US 2011/0170556 A1    Jul. 14, 2011

(30) Foreign Application Priority Data
Sep. 26, 2008   (JP) .................................. 2008-248151

(51) Int. Cl.
| H04L 12/28 | (2006.01) |
| H04L 12/56 | (2006.01) |
| H04J 3/16 | (2006.01) |
| H04J 3/22 | (2006.01) |
| H04N 7/12 | (2006.01) |
| H04N 11/02 | (2006.01) |
| H04N 21/4402 | (2011.01) |
| H04L 29/06 | (2006.01) |
| H04N 19/59 | (2014.01) |
| H04N 21/436 | (2011.01) |
| H04N 7/173 | (2011.01) |
| H04N 19/40 | (2014.01) |
| H04N 19/139 | (2014.01) |
| H04N 19/587 | (2014.01) |

(52) U.S. Cl.
CPC ... *H04N 7/17318* (2013.01); *H04N 21/440263* (2013.01); *H04L 65/103* (2013.01); *H04N 19/00757* (2013.01); *H04N 21/43615* (2013.01); *H04N 19/00472* (2013.01); *H04L 65/605* (2013.01); *H04N 19/00151* (2013.01); *H04N 19/00751* (2013.01)
USPC ........................ 370/401; 370/466; 375/240.16

(58) Field of Classification Search
CPC ............ H04N 7/014; H04N 19/00151; H04N 19/00715
USPC ........ 370/352, 401, 466; 375/240.12, 240.01, 375/240; 348/416.1
See application file for complete search history.

(56) References Cited

U.S. PATENT DOCUMENTS

| 7,720,023 B2 * | 5/2010 | Bais et al. ..................... 370/328 |
| 2002/0036707 A1 * | 3/2002 | Gu ................................ 348/497 |

(Continued)

FOREIGN PATENT DOCUMENTS

| JP | 2001313937 A | 11/2001 |
| JP | 2002271777 A | 9/2002 |

(Continued)

OTHER PUBLICATIONS

International Search Report for PCT/JP2009/066658 mailed Nov. 2, 2009.

*Primary Examiner* — Hoang-Chuong Vu
(74) *Attorney, Agent, or Firm* — Sughrue Mion, PLLC

(57) ABSTRACT

A gateway apparatus receives an image signal, which includes a moving image signal or a still image signal, from a first terminal connected to a first network, performs conversion that enhances resolution and image quality of the image signal, and transmits the converted image signal to a second terminal connected to a second network.

11 Claims, 5 Drawing Sheets

(56) References Cited

U.S. PATENT DOCUMENTS

| | | | |
|---|---|---|---|
| 2005/0232284 A1* | 10/2005 | Karaoguz et al. | 370/401 |
| 2006/0031316 A1* | 2/2006 | Forstadius | 709/206 |
| 2008/0002770 A1* | 1/2008 | Ugur et al. | 375/240.16 |
| 2008/0079733 A1* | 4/2008 | Benson et al. | 345/502 |
| 2009/0097563 A1* | 4/2009 | Brown et al. | 375/240.16 |
| 2010/0017468 A1* | 1/2010 | Forstadius | 709/203 |
| 2011/0145868 A1* | 6/2011 | Hultkrantz | 725/62 |
| 2011/0225609 A1* | 9/2011 | Li et al. | 725/38 |
| 2014/0192870 A1* | 7/2014 | Eleftheriadis et al. | 375/240.12 |

FOREIGN PATENT DOCUMENTS

| | | |
|---|---|---|
| JP | 2007074307 A | 3/2007 |
| WO | 2008032590 A | 3/2008 |

* cited by examiner

RE-SEARCHING REFERENCE IMAGE FOR MOTION VECTOR AND CONVERTING RESOLUTION USING IMAGE GENERATED BY APPLYING MOTION VECTOR TO REFERENCE IMAGE

RELATED APPLICATIONS

The present application is the National Phase of PCT/JP2009/066658, filed Sep. 25, 2009, which claims priority from Japanese Patent Application No. 2008-248151 (filed on Sep. 26, 2008) the content of which is hereby incorporated in its entirety by reference into this specification.

TECHNICAL FIELD

The present invention relates to a gateway apparatus that receives an image signal from a first terminal connected to a first network and transmits the received image signal to a second terminal connected to a second network.

BACKGROUND

Such services that interconnects different networks comprising a first network which includes, for example, a mobile network and a second network which includes, for example, a packet network or a next generation network (NGN), and allows terminals connected to the networks to exchange a moving image or a still image, have been already started. In these services, a gateway apparatus is used.

When communication is carried out between terminals using a moving image or a still image, compression/encoding of the moving image is performed on a terminal side in order to transmit it efficiently at a low bit rate. As a scheme for compression/encoding, ITU-T (International Telecommunication Union for Telecommunication Standardization sector) Recommendation H.263 and MPEG-4 (Moving Picture Experts Group Phase 4) internationally standardized by ISO/IEC (International Organization for Standardization/International Electro technical Commission) are known. In addition, H.264/MPEG-4 AVC (Advanced Video Coding), internationally standardized by ITU-T and ISO/IEC, compresses data more efficiently than the moving image compression/encoding schemes described above.

As a gateway that converts a moving image, Patent Document 1 discloses a gateway that converts moving image data, which is received from a server, using encoded parameters (encoding method, frame size, etc.) derived from a characteristic of a terminal to which the moving image data from the server is to be transmitted. As a configuration for extending temporal resolution, Patent Document 2 discloses a configuration in which the number of samples (frame rate) in a time-axis direction of a low-resolution moving image up-sampled, unwanted high-frequency components are eliminated, and a high-frequency prediction is made in the time-axis direction through non-linear prediction and, if the high-frequency prediction is correct, the temporal resolution is extended. As will be apparent from the description below, the present invention is absolutely different from the inventions described in those Patent Documents.

Patent Document 1: Japanese Patent Publication Kokai No. JP-P2001-313937A

Patent Document 2: Japanese Patent Publication Kokai No. JP-P2007-74307A

SUMMARY

All the disclosed contents of Patent Documents 1 and 2 given above are hereby incorporated by reference into this specification.

The following gives an analysis of the present invention.

In the service and the apparatus in the related art, the bandwidth of a second network, especially its downlink bandwidth, is several times wider than that of a first network, especially its uplink bandwidth, and so a second terminal has capability to process a higher-definition image in many cases. Even in such a case, the gateway apparatus transmits a moving image signal or a still image signal, which is transmitted from a terminal connected to the first network and which has an insufficient resolution and an insufficient image quality, directly to the second network. As a result, the moving image or the still image has an insufficient resolution or an insufficient image quality when displayed on the second terminal connected to the second network. This problem makes it difficult to increase the number of subscribers of the service.

It is an object of the present invention to provide a gateway apparatus, a method, a system, and a program that convert an image signal, received from a first terminal connected to a first network, and transmit the converted image signal to a second terminal connected to a second network to allow a sufficient resolution and a sufficient image quality to be given to the second terminal.

The invention provides the following general configuration, though not limited thereto.

In one aspect of the present invention, there is provided a gateway apparatus comprising a reception unit that receives an image signal, which includes a moving image or a still image, from a first terminal connected to a first network; a conversion unit that performs conversion that enhances resolution and image quality of the received image signal; and a transmission unit that transmits the converted image signal to a second terminal connected to a second network.

In another aspect of the present invention, there is provided a gateway method comprising:

a gateway receiving an image signal, which includes a moving image or a still image, from a first terminal connected to a first network;

the gateway performing conversion that enhances resolution and image quality of the received image signal; and the gateway transmitting the converted image signal to a second terminal connected to a second network.

In still another aspect of the present invention, there is provided a program causing a computer, which configures a gateway apparatus, to execute:

receiving processing that receives an image signal, which includes a moving image or a still image, from a first terminal connected to a first network;

conversion processing that performs conversion which enhances resolution and image quality of the received image signal; and transmission processing that transmits the converted image signal to a second terminal connected to a second network.

In still another aspect of the present invention, there is provided a network system comprising:

a first terminal connected to a first network;

a second terminal connected to a second network; and a gateway apparatus, wherein the gateway apparatus receives an image signal, which includes a moving image or a still image, from the first terminal, performs conversion that enhances resolution and image quality of the received image signal, and transmits the converted image signal to the second terminal.

The present invention converts an image signal, received from a first terminal (for example, a mobile phone) connected to a first network, and transmits the converted image signal to a second terminal connected to a second network to allow a sufficient resolution and a sufficient image quality to be given to the second terminal.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODE

The exemplary embodiments of the present invention will be described. In one of modes of the present invention, there is provided a gateway apparatus comprising a reception unit that receives a stream or a packet, which includes a moving image or a still image, from a first terminal connected to a first network, a conversion unit that performs conversion that enhances resolution and image quality of the received moving image or still image: and a transmission unit that transmits the converted signal to a second terminal connected to a second network that is different from the first network.

According to the present invention, there is provided a gateway apparatus wherein the first network includes a mobile circuit-switched network and the second network includes a packet network or a next generation network (NGN).

According to the present invention, there is provided a gateway apparatus wherein the first network includes a mobile packet network and the second network includes a packet network or a next generation network (NGN). The following describes the present invention with reference to exemplary embodiments.

Exemplary Embodiments

Figure 1:
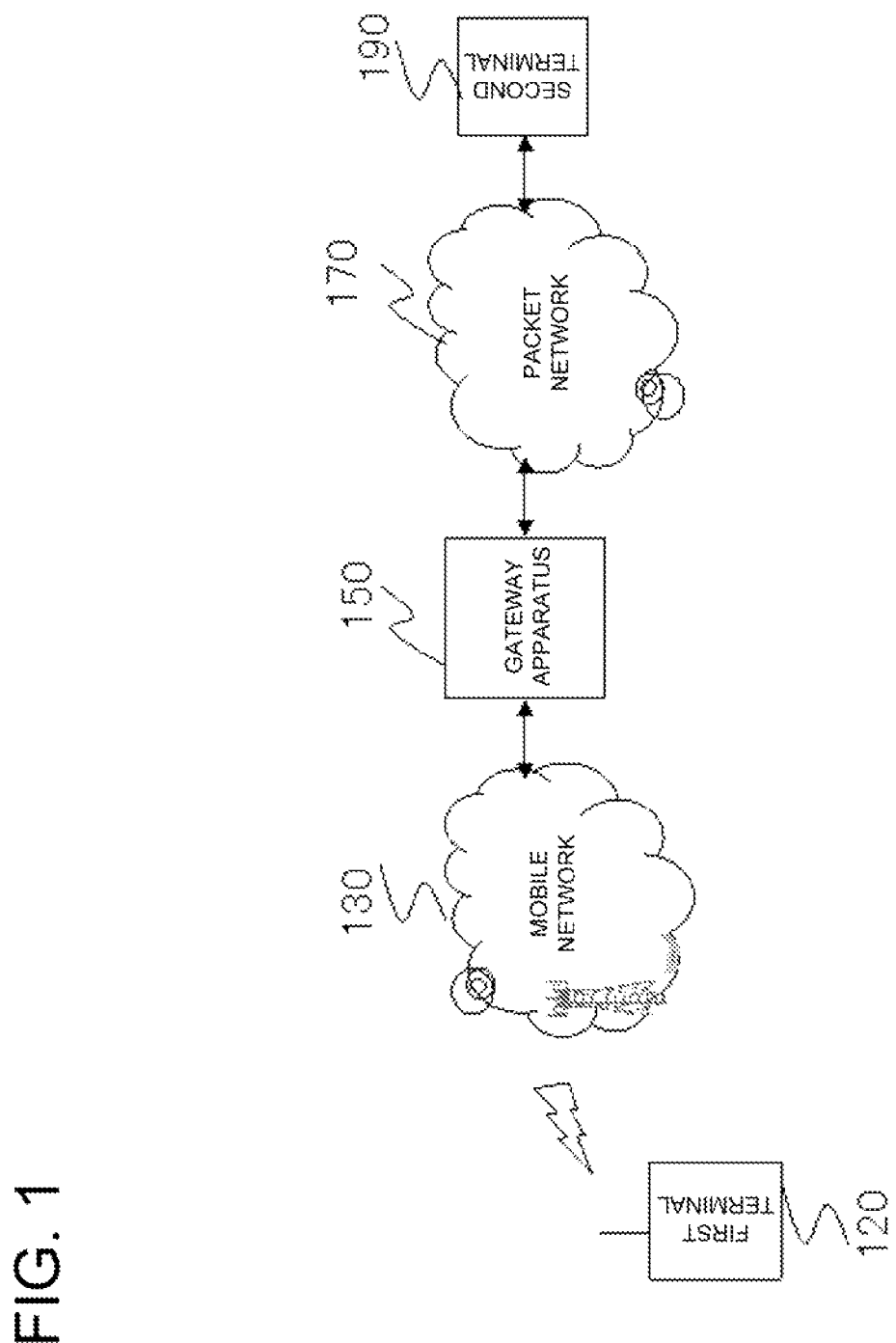
FIG. 1 is a diagram showing the system configuration of one example of the present invention.

In exemplary embodiments given below, an example of the configuration in which a video (moving image) signal is used will be described. FIG. 1 shows an example of a connection mode in which a gateway apparatus according to the present invention and a first network, a second network, a first terminal, and a second terminal are connected.

In FIG. 1, the numeral 120 designates a first terminal, for example, a mobile terminal. The numeral 130 designates an example of a first network, for example, a mobile network. A gateway apparatus 150 performs conversion that enhances resolution and image quality of a video stream or a video packet, received from the first network and transmits the converted moving image stream or packet to a second terminal 190 via a second network 170. As the second network 170, a packet network of a fixed network or a next generation network (NGN) can be used.

This example is applicable to two types of the mobile network 130, a mobile circuit-switched network and a mobile packet network. The configuration of the gateway apparatus 150 depends on which type of the mobile network 130 is used. The following shows the configuration of the gateway apparatus 150 for each network type in FIG. 2 and FIG. 3.

Figure 2:
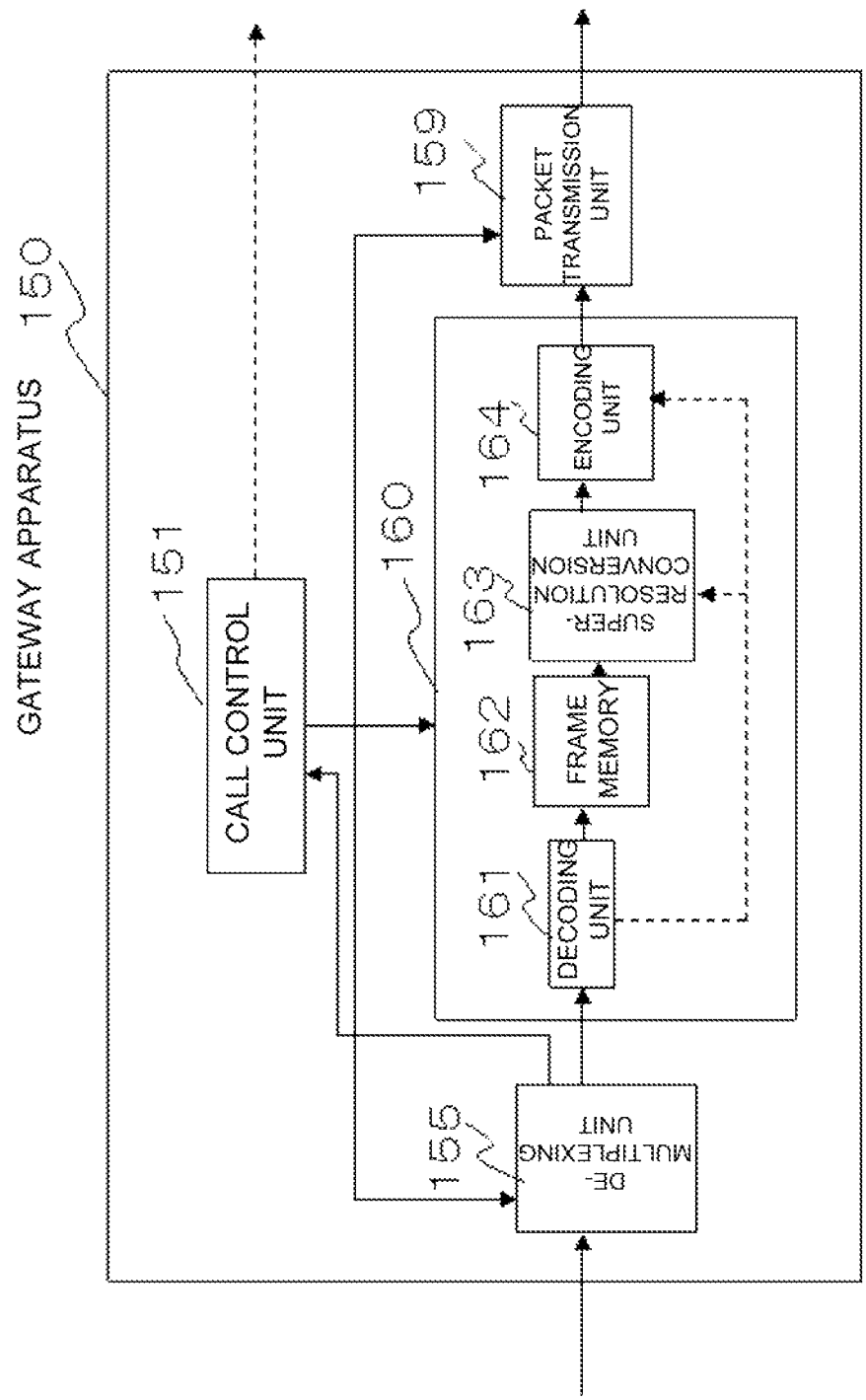
FIG. 2 is a diagram showing the configuration of a gateway apparatus in a first example of the present invention.

FIG. 2 is a diagram showing an example of the main part configuration of the gateway apparatus 150, wherein the mobile network 130 includes a mobile circuit-switched network. As shown in FIG. 2, the gateway apparatus 150 includes a demultiplexing unit 155, a call control unit 151, a conversion unit 160, and a packet transmission unit 159.

Referring to FIG. 1 and FIG. 2, the following describes an example in which the first terminal 120 is connected to the gateway apparatus 150 via the mobile circuit-switched network 130.

The mobile terminal 120 is assumed to have the 3G-324M protocol (call connection control protocol for a 3G mobile phone network and an IP network) installed. For the detailed description of the 3G-324M protocol, see the 3GPP TS26.110 specification or TR26.911 specification.

In FIG. 2, the demultiplexing unit 155 of the gateway apparatus 150 receives an H.223 multiplexed signal and demultiplexes the received signal into an H.245 call control signal, a video signal, and an audio signal.

The demultiplexing unit 155 outputs the demultiplexed H.245 call control signal to the call control unit 151 and outputs the demultiplexed video signal to a decoding unit 161 of the conversion unit 160. For the details of H.223 and H.245, see the ITU-T H.223 specification and ITU-T H.245 specification, respectively.

The call control unit 151 analyzes the H.245 call control signal and outputs capability information on the first terminal (120), which is required for decoding the video signal, to the decoding unit 161 of the conversion unit 160.

Although not limited thereto, the capability information on the first terminal in this example specifies that a video codec is MPEG-4 SP@L0 (Simple Profile Level 0), a bit rate is 64 kbps (kilobits/second), an image resolution corresponds to QCIF (Quadrature Common Intermediate Format), and a frame rate is 15 fps (frames/second).

In addition, the call control unit 151 exchanges call control information (for example, a reception IP address of the second terminal 190) and the capability information (signal indicated by the broken line beginning at the call control unit 151) with the second terminal 190 connected via the packet network 170, using, for example, SIP (Session Initiation Protocol) and SDP (Session Description Protocol). Although not limited thereto, the capability information on the second terminal used in this example specifies that H.264 BP (Baseline Profile) is installed as the video codec with the BP profile level conforming to up to level 1.2. This means that the maximum bit rate is 384 kbps, the screen resolution corresponds to CIF (Common Intermediate Format), and the frame rate is 15 fps. The call control unit 151 transfers the capability information on the second terminal to the conversion unit 160.

The conversion unit 160 comprises a decoding unit 161, a frame memory 162, a super-resolution conversion unit 163, and an encoding unit 164.

The decoding unit 161 receives the capability information on the first terminal from the call control unit 151 and decodes the video signal by MPEG-4 SP level 0 with the bit rate of 64 kbps, screen resolution corresponding to QCIF, and frame rate of 15 fps. The decoding unit 161 stores the decoded video signal in the frame memory 162, on a per a frame basis.

The super-resolution conversion unit 163 receives the capability information on the second terminal from the call control unit 151, reads the video signal stored in the frame memory 162, and improves the image quality by increasing the resolution.

To extend the resolution, one of the following techniques is used.

The resolution is extended by increasing the number of pixels using a plurality of image frames as a reference image for the image frame to be converted; and The number of pixels is increased using pixels in different positions in the image frame to be converted.

The super-resolution conversion unit 163 may be configured to select an optimal technique from those techniques under the constraint of an operation amount and a memory amount that may be allotted to the processing of the super-resolution conversion unit 163.

When a past (previous in time) reference frame is used for a frame to be converted, the super-resolution conversion unit 163 receives a motion vector of each of the macro-blocks decoded by the decoding unit 161 and re-executes motion vector search processing (determines a position of a macro-block which is one of the macro blocks in the reference frame search range and whose difference from the macro-block of the frame to be converted is the smallest) for pixels included in the macro-block, based on the motion vector to find a detailed motion vector (for example, on a half-pixel basis). And, the super-resolution conversion unit 163 may employ a configuration in which the number of pixels of the frame to be converted is increased by applying the detailed motion vector, determined by the re-search, to pixels of the past reference frame and by using a frame that is moved according to the detailed motion vector. The super-resolution conversion unit 163 may also employ a configuration in which, instead of using a motion vector of the macro-block received from the decoding unit 161, a motion vector is searched for from a frame to be converted (current frame) and a reference frame.

When only the frame whose resolution is to be extended is used, the super-resolution conversion unit 163 increases the resolution and improves the image quality by performing the processing in which the edge part is detected and the number of pixels is increased using pixels near the edge or pixels near the edge are corrected or in which the edge pant is detected and is emphasized. This processing is performed for a moving image and/or a still image.

By estimating a motion direction, the super-resolution conversion unit 163 interpolates a frame image in a temporal direction (inserts one frame between the preceding and following frames) and interpolates the frame rate to increase the frame rate, for example, from 15 fps to 30 fps.

The encoding unit 164 receives capability information on the second terminal from the call control unit 151, receives an output signal from the super-resolution conversion unit 163, and encodes the signal using, for example, the H.264 BP Level 1.2 encoding scheme with the bit rate of 384 kbps, the screen resolution corresponding to CIF, and the frame rate of 15 fps.

To reduce the calculation amount of the motion vector search, the encoding unit 164 may also be configured to receive the motion vector information from the decoding unit 161 and, based on the received motion vector information (conversion corresponding to an increase in the resolution is performed for the motion vector), to search a neighborhood of the motion vector for a new motion vector for the image signal converted by the super-resolution conversion unit 163.

The packet transmission unit 159 receives a reception IP address of the second terminal 190 from the call control unit 151, receives an H.264 compressed/encoded stream from the encoding unit 164, and transmits the compressed/encoded stream to the reception IP address as an RTP packet with the compressed/encoded stream included in the RTP payload.

The RTP packet, transmitted by the packet transmission unit 159, is transmitted via the packet network 170 and is received by the second terminal 190.

Figure 4:
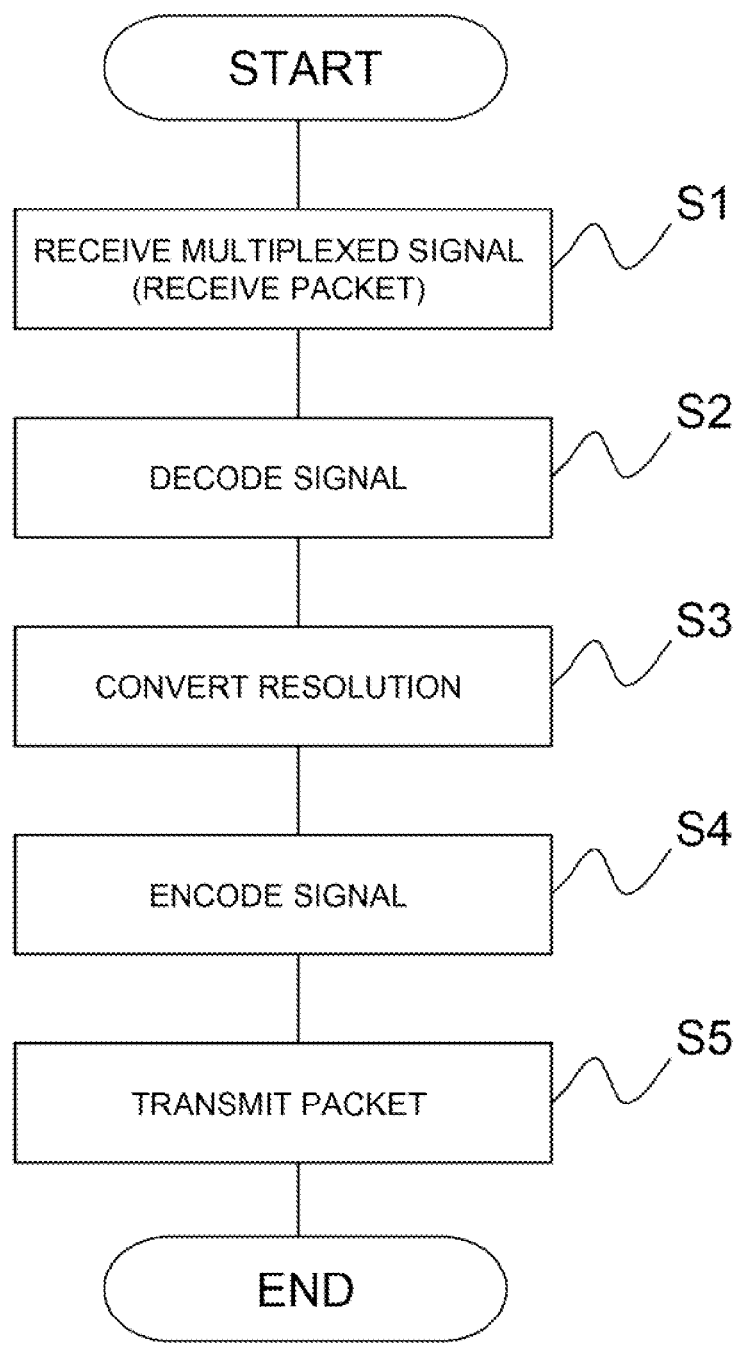
FIG. 4 is a diagram showing the processing procedure of the gateway apparatus of the present invention.

The following describes the processing procedure of the gateway apparatus in this example with reference to FIG. 4.

Step S1: The demultiplexing unit 155 receives an H.223 multiplexed signal from the first terminal. The demultiplexing unit 155 demultiplexer the received signal into an H.245 call control signal and a video signal, outputs the demultiplexed H.245 call control signal to the call control unit 151, and outputs the demultiplexed video signal to the decoding unit 161 of the conversion unit 160.

Step S2: The decoding unit 161 decodes the video signal according to the capability information on the first terminal received from the call control unit 151.

Step S3: The super-resolution conversion unit 163 improves the image quality by extending the resolution of the decoded video signal.

Step S4: The encoding unit 164 encodes the video signal received from the super-resolution conversion unit 163 based on the capability information on the second terminal received from the call control unit 151.

Step S5: The packet transmission unit 159 transmits the signal, encoded by the encoding unit 164, as an RTP packet with the encoded signal stored in the RTP payload.

Figure 5:
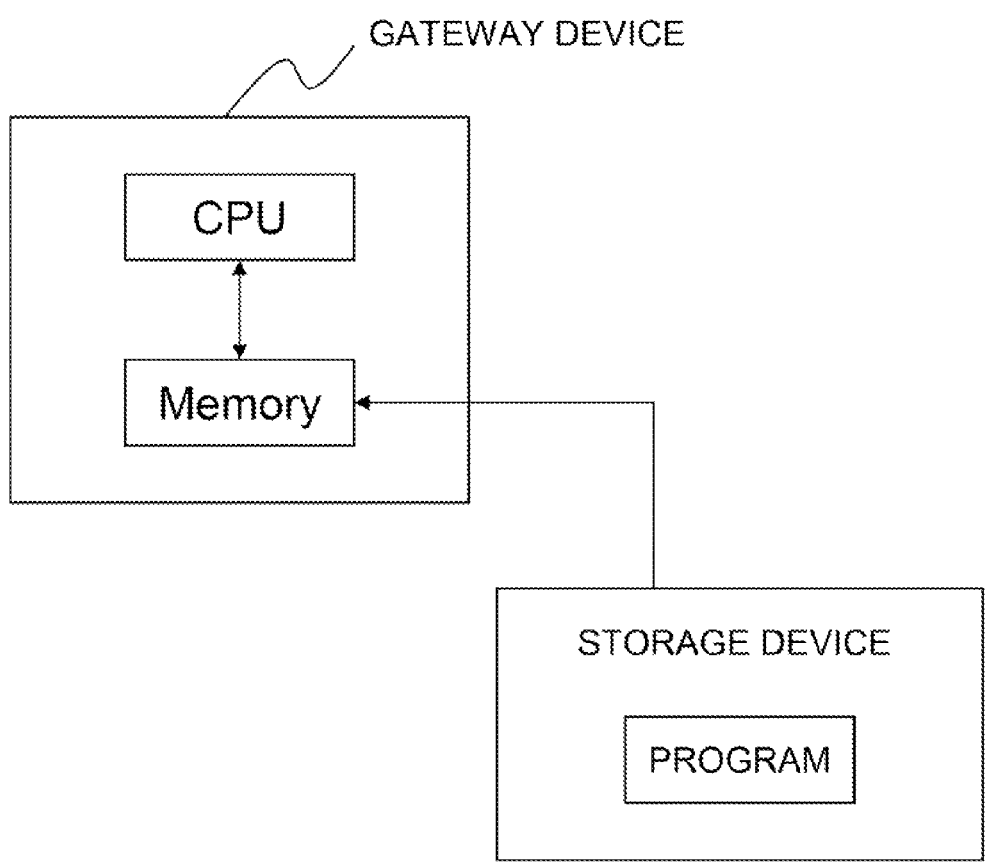
FIG. 5 is a diagram showing a modification of the gateway apparatus in the example of the present invention.

The function and the processing of steps S1 to S5 of the gateway apparatus described above may of course be implemented by tone or more programs executed on a computer configuring the gateway apparatus. This is also true in the example that will be described later. In this case, the computer (CPU) that configures the gateway apparatus implements the processing of the conversion unit described above and the processing of the packet reception unit, packet transmission unit, and call control unit by loading the programs from the storage apparatus into the memory for execution therein as shown in FIG. 5. The storage apparatus, in which one or more programs are stored, may of course be connected to the gateway apparatus over the network.

In the example described above, any video compression/encoding scheme may be used, for example, any of H.263, MPEG-4, and H.264 may be used.

The following describes the effect of this exemplary embodiment.

According to this exemplary embodiment, the gateway apparatus performs the conversion, in which the resolution and the image quality are increased, for a moving image signal or a still image signal, received from the first terminal (for example, a mobile phone) connected to the first network (for example, mobile network), and then transmits the converted moving image signal or still image signal to the second terminal connected to a packet network. This provides the service that utilizes a wide bandwidth of the downlink of the second network (for example, a packet network or an NGN) and the high performance of the second terminal, thus allowing the second terminal to enjoy a high image-quality image.

Figure 3:
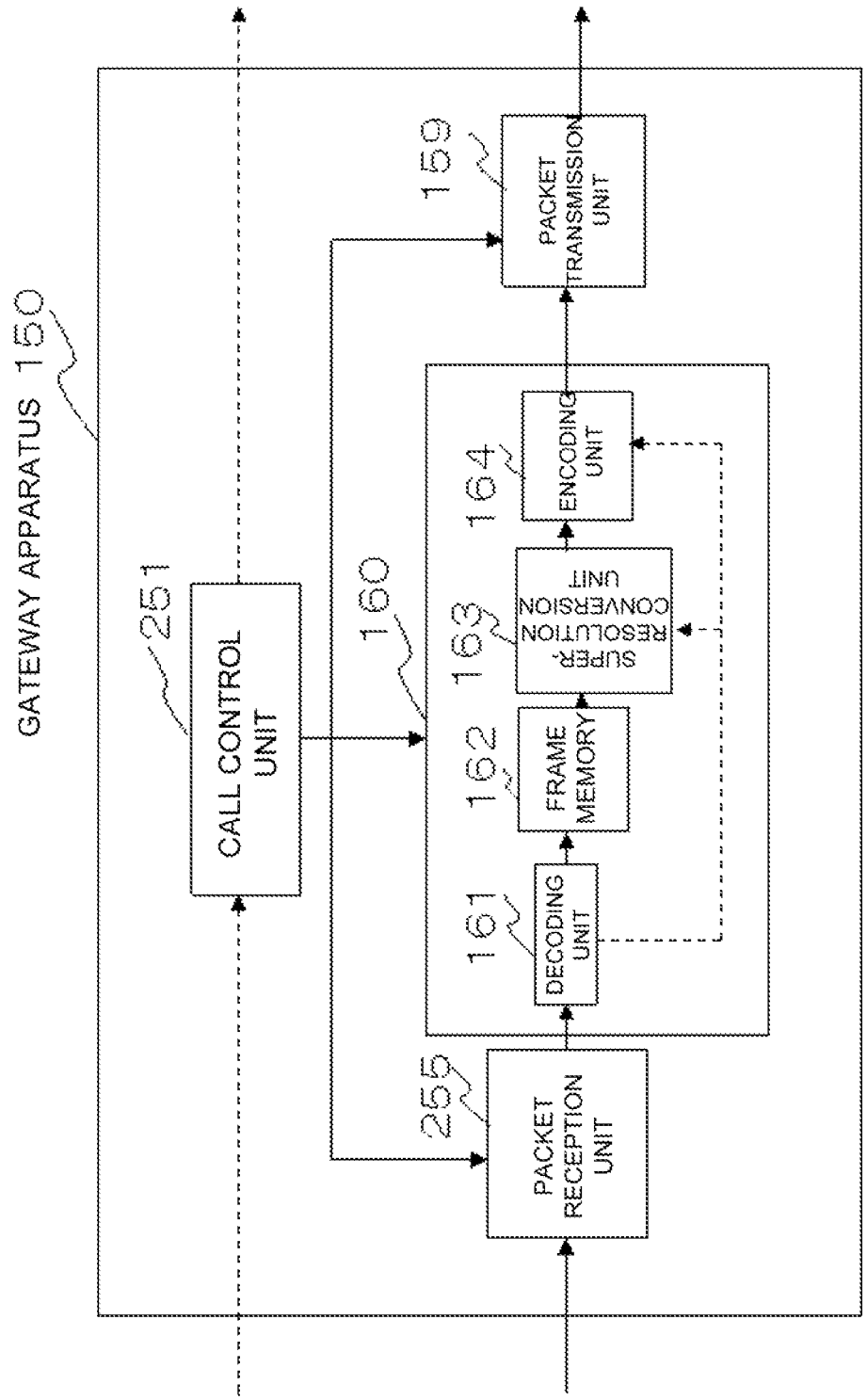
FIG. 3 is a diagram showing the configuration of a gateway apparatus in a second example of the present invention.

FIG. 3 is a diagram showing the main part configuration of a second exemplary embodiment of a gateway apparatus 150 of the present invention. The figure shows the configuration where a mobile network 130 includes a mobile packet network. In FIG. 3, the same reference numeral is used for the corresponding element in FIG. 2. Because the element in FIG. 3 with the same reference numeral as that in FIG. 2 performs the same operation as that in FIG. 2, the description of that element will be omitted to avoid duplication.

A call control unit 251 receives the session control signal, using a SIP signal, from a first terminal 120 (indicated by the broken line entering the call control unit 251). In addition, the call control unit 251 receives capability information on the first terminal 120 using SDP (Session Description Protocol) (indicated by the broken line entering the call control unit 251) and outputs the capability information to a conversion unit 160.

Although not limited thereto, the capability information on the first terminal specifies that a video codec is MPEG-4 SP (Simple Profile) Level 0, a bit rate is 64 kbps, a screen resolution corresponds to QCIF, and a frame rate is 15 fps.

The call control unit 251 exchanges the call control information (for example, a reception IP address of a second terminal 190) and the capability information with the second terminal 190, using SIP and SDP. In the description below, the capability information on the second terminal is assumed to specify that the H.264 BP is installed as the video codec and that the BP profile up to level 1.2 may be used. This means that the maximum bit rate is 384 kbps, the screen resolution corresponds to CIF, and the frame rate is 15 fps. The call control unit 251 transmits the capability information to the conversion unit 160.

A packet reception unit 255 receives the capability information on the first terminal from the call control unit 251. The packet reception unit 255 further receives a video packet from the first terminal 120 via the mobile packet network 130, reads the video stream stored in a payload of the packet, and outputs the video stream to a decoding unit 161 of the conversion unit 160.

The conversion unit 160 receives the capability information on the first terminal and the capability information on the second terminal from the call control unit 251, outputs the former to the decoding unit 161, and outputs the latter to a super-resolution conversion unit 163 and an encoding unit 164. Because the operation of the conversion unit 160 is the same as that of the conversion unit 160 in FIG. 2, its description is omitted.

A packet transmission unit 159 receives a IP address of the second terminal, which is a transmission destination, and the like from the call control unit 251 and further receives the converted video stream from the conversion unit 160. Because the operation of the packet transmission unit 159 is the same as that of the packet transmission unit 159 in FIG. 2, its description is omitted.

The processing procedure in this example is the same as that of the processing procedure of the first example shown in FIG. 4 except that the packet reception processing is performed in step S1 and, therefore, the description is omitted.

Although the call control unit that performs the C-Plane (Control Plane) processing and the H.223 demultiplexing unit, packet reception unit, conversion unit, and packet transmission unit that perform the U-Plane (User Plane) processing are all stored in the gateway apparatus in the examples described above, a configuration is also possible in which the C-Plane processing and the U-Plane processing are performed in separate apparatuses. Such a configuration ensures scalability independently for the C-Plane and the U-Plane.

Although the video (moving image) signal is processed in the examples described above, the same configuration is also possible for the still image signal.

The whole or part of the exemplary embodiments disclosed above can be described, but not limited to, the following supplementary notes.

(Supplementary note 1) A gateway apparatus in this exemplary embodiment comprises a reception unit that receives an image signal including a moving image or a still image from a first terminal connected to a first network;

a conversion unit that performs conversion which enhances resolution and image quality of said received image signal; and a transmission unit that transmits said converted image signal to a second terminal connected to a second network.

(Supplementary note 2) The gateway apparatus according to Supplementary note 1, wherein the conversion unit comprises:

a decoding unit that decodes said received image signal in a scheme corresponding to capability information on said first terminal;

a resolution conversion unit that converts resolution of said decoded image signal to improve image quality thereof, based on capability information on said second terminal; and an encoding unit that receives an image signal whose resolution is converted by said resolution conversion unit, and encodes said received image signal in a scheme corresponding to said capability information on said second terminal.

(Supplementary note 3) The gateway apparatus according to Supplementary note 2, wherein the resolution conversion unit re-searches a past reference image for a motion vector based on a motion vector decoded by the decoding unit and converts the resolution of the image signal, using an image generated by applying there-searched motion vector to the reference image.

(Supplementary note 4) The gateway apparatus in this exemplary embodiment according to one of Supplementary notes 1 to 3, wherein the first network is a mobile circuit-switched network and the second network is a packet network or a next generation network (NGN).

(Supplementary note 5) The gateway apparatus according to one of Supplementary notes 1 to 3, wherein the first network is a mobile packet network and the second network is a packet network or a next generation network (NGN).

(Supplementary note 6) The gateway apparatus according to Supplementary note 2 or 3, wherein the reception unit comprises:

a demultiplexing unit that receives a multiplexed signal from the first terminal, demultiplexes the received signal into a call control signal and a video signal, transmits the demultiplexed call control signal to a call control unit, and transmits the demultiplexed video signal to the conversion unit or a packet reception unit that receives a packet or a stream, which includes the image signal including a moving image or a still image, from the first terminal.

(Supplementary note 7) A gateway method comprises:

a gateway receiving an image signal, which includes a moving image or a still image, from a first terminal connected to a first network;

the gateway performing resolution conversion that enhances resolution and image quality of the received image signal; and the gateway transmitting the converted image signal to a second terminal connected to a second network.

(Supplementary note 8) The method according to Supplementary note 7, wherein the gateway decodes the received image signal in a scheme corresponding to capability information on the first terminal;

performs resolution conversion by converting resolution of the decoded image signal to improve the image quality, based on capability information on the second terminal; and receives the converted image signal and encodes the received image signal in a scheme corresponding to the capability information on the second terminal.

(Supplementary note 9) The method according to Supplementary note 7 or 8, wherein the first network is a mobile circuit-switched network and the second network is a packet network or a next generation network (NGN).

(Supplementary note 10) The method is the method according to Supplementary note 7 or 8, wherein the first network is a mobile packet network and the second network is a packet network or a next generation network (NGN).

(Supplementary note 11) A program causes a computer, which configures a gateway apparatus, to execute:

receiving processing that receives an image signal, which includes a moving image or a still image, from a first terminal connected to a first network; and resolution conversion processing of performing conversion that enhances resolution and image quality of the received image signal; and transmission processing that transmits the converted image signal to a second terminal connected to a second network.

(Supplementary note 12) The program according to Supplementary note 11, wherein the resolution conversion processing decodes the received image signal in a scheme corresponding to capability information on the first terminal;

converts resolution of the decoded image signal to improve image quality, based on capability information on the second terminal; and receives the converted image signal; and encodes the received image signal in a scheme corresponding to the capability information on the second terminal.

(Supplementary note 13) The program according to Supplementary note 11 or 12, wherein the first network is a mobile circuit-switched network and the second network is a packet network or a next generation network (NON).

(Supplementary note 14) The program according to Supplementary note 11 or 12, wherein the first network is a mobile packet network and the second network is a packet network or a next generation network (NGN).

(Supplementary note 15) A system comprises
 a first terminal connected to a first network;
 a second terminal connected to a second network; and
 a gateway apparatus connected to the first network and the second network, wherein
 the gateway apparatus receives an image signal, which includes a moving image or a still image, from the first terminal, performs conversion that enhances resolution and image quality of the received image signal, and transmits the converted image signal to the second terminal.

(Supplementary note 16) The system according to Supplementary note 15, wherein the gateway apparatus decodes the received image signal in a scheme corresponding to capability information on the first terminal, performs resolution conversion by converting the resolution of the decoded image signal to improve the image quality based on capability information on the second terminal, and then receives the converted image signal and encodes the received image signal in a scheme corresponding to the capability information on the second terminal.

(Supplementary note 17) The system according to Supplementary note 15 or 16; wherein the first network is a mobile circuit-switched network and the second network is a packet network or a next generation network (NGN).

(Supplementary note 18) The system according to Supplementary note 15 or 16, wherein the first network is a mobile packet network and the second network is a packet network or a next generation network (NGN).

(Supplementary note 19) The system according to Supplementary note 15 or 16, wherein the gateway apparatus comprises a demultiplexing unit that receives a multiplexed signal from the first terminal and demultiplexes the received signal into a call control signal and a video signal or a packet reception unit that receives a packet or a stream, which includes the image signal including a moving image or a still image, from the first terminal.

The disclosure of Patent Documents given above is hereby incorporated by reference into this specification. The modes and the exemplary embodiments may be changed and adjusted in the scope of the entire disclosure (including claims) of the present invention and based on the basic technological concept. In the scope of the claims of the present invention, various disclosed elements may be combined and selected in a variety of ways. That is, it is apparent that the present invention includes various modifications and changes that may be made by those skilled in the art according to the entire disclosure, including claims, and technological concepts.

What is claimed is:

1. A gateway apparatus comprising:
 a reception unit that receives an image signal including a moving image or a still image from a first terminal connected to a first network;
 a conversion unit that performs conversion which enhances resolution and image quality of said received image signal; and
 a transmission unit that transmits said converted image signal to a second terminal connected to a second network, wherein
 said conversion unit comprises:
 a decoding unit that decodes said received image signal in a scheme corresponding to capability information on said first terminal;
 a resolution conversion unit that converts resolution of said decoded image signal to improve image quality thereof, based on capability information on said second terminal, said resolution conversion unit, in converting resolution of said decoded image signal of a moving image, receiving a motion vector of each of macro-blocks decoded by said decoding unit, said resolution conversion unit re-executing motion vector search processing for pixels included in each of said macro-blocks based on said motion vector to find a detailed motion vector, and by applying, said detailed motion vector determined by said re-executing motion vector search processing, to pixels of a past reference frame and by using a frame being moved according to said detailed motion vector, increasing the number of pixels of a frame whose resolution is to be converted; and
 an encoding unit that receives an image signal whose resolution is converted by said resolution conversion unit, and encodes said received image signal in a scheme corresponding to said capability information on said second terminal.

2. The gateway apparatus according to claim 1, wherein said first network includes a mobile circuit-switched network and said second network includes a packet network or a next generation network (NGN).

3. The gateway apparatus according to claim 1, wherein said first network includes a mobile packet network and said second network includes a packet network or a next generation network (NGN).

4. The gateway apparatus according to claim 1, wherein said reception unit comprises:
a demultiplexing unit that receives a multiplexed signal from said first terminal, demultiplexes said received signal into a call control signal and a video signal, transmits said demultiplexed call control signal to a call control unit, and transmits said demultiplexed video signal to said conversion unit, or
a packet reception unit that receives a packet or a stream from said first terminal, said packet or stream including said image signal which includes said moving image or said still image.

5. A gateway method comprising:
receiving an image signal from a first terminal connected to a first network, said image signal including a moving image or a still image;
performing resolution conversion that enhances resolution and image quality of said received image signal; and
transmitting said converted image signal to a second terminal connected to a second network, wherein a step of said performing resolution conversion comprises:
decoding said received image signal in a scheme corresponding to capability information on said first terminal;
performing converting resolution of said decoded image signal to improve image quality thereof, based on capability information on said second terminal, in converting resolution of said decoded image signal of a moving image, receiving a motion vector of each of macro-blocks decoded, re-executing motion vector search processing for pixels included in each of said macro-blocks based on said motion vector to find a detailed motion vector, and by applying, said detailed motion vector determined by said re-executing motion vector search processing, to pixels of a past reference frame and by using a frame being moved according to said detailed motion vector, increasing the number of pixels of a frame whose resolution is to be converted; and
receiving an image signal whose resolution is converted by said step of converting resolution, and encoding said received image signal in a scheme corresponding to said capability information on said second terminal.

6. The gateway method according to claim 5, wherein said first network includes a mobile circuit-switched network and said second network includes a packet network or a next generation network (NGN).

7. The gateway method according to claim 5, wherein said first network includes a mobile packet network and said second network includes a packet network or a next generation network (NGN).

8. A network system comprising:
a first terminal connected to a first network;
a second terminal connected to a second network; and
a gateway apparatus connected to said first network and said second network, wherein
said gateway apparatus comprises:
a reception unit that receives an image signal from said first terminal, said image signal including a moving image or a still image,
a conversion unit that performs conversion that enhances resolution and image quality of said received image signal, and
a transmission unit that transmits said converted image signal to said second terminal, wherein said conversion unit comprises:
a decoding unit that decodes said received image signal in a scheme corresponding to capability information on said first terminal;
a resolution conversion unit that converts resolution of said decoded image signal to improve image quality thereof, based on capability information on said second terminal, said resolution conversion unit, in converting resolution of said decoded image signal of a moving image, receiving a motion vector of each of macro-blocks decoded by said decoding unit, said resolution conversion unit re-executing motion vector search processing for pixels included in each of said macro-blocks based on said motion vector to find a detailed motion vector, and by applying, said detailed motion vector determined by said re-executing motion vector search processing, to pixels of a past reference frame and by using a frame being moved according to said detailed motion vector, increasing the number of pixels of a frame whose resolution is to be converted; and
an encoding unit that receives an image signal whose resolution is converted by said resolution conversion unit, and encodes said received image signal in a scheme corresponding to said capability information on said second terminal.

9. The network system according to claim 8, wherein said first network includes a mobile circuit-switched network and said second network includes a packet network or a next generation network (NGN).

10. The network system as defined claim 8, wherein said first network includes a mobile packet network and said second network includes a packet network or a next generation network (NGN).

11. The network system according to claim 8, wherein said gateway apparatus comprises:
a demultiplexing unit that receives a multiplexed signal from said first terminal and demultiplexes said received signal into a call control signal and a video signal, or
a packet reception unit that receives a packet or a stream from said first terminal, said packet or stream including said image signal, said image signal including said moving image or said still image.

* * * * *